May 31, 1960 F. W. WALKER 2,938,737
MOLDED FIBROUS GLASS ARTICLE
Filed Dec. 3, 1953

INVENTOR.
FREDERICK W. WALKER
BY
ATTORNEYS

United States Patent Office

2,938,737
Patented May 31, 1960

2,938,737
MOLDED FIBROUS GLASS ARTICLE

Frederick W. Walker, Johnstown, Ohio, assignor to Owens-Corning Fiberglas Corporation, a corporation of Delaware Filed Dec. 3, 1953, Ser. No. 396,030

9 Claims. (Cl. 280—150)

This invention relates to the molding of fibrous glass masses with particular reference to the improvement of impact resistance characteristics and surface properties of automobile crash pads molded of such material.

In the molding of fibrous-glass articles such as automobile crash pads, it has been found difficult to provide smooth surfaces for the article if the density of the mass of fibers in the final product is not above certain values. For instance, the density required to impart the desired degree of smoothness to the mass of fibers is often larger than that which will provide the degree of softness and resilience desired for impact purposes.

Additionally, molded products of irregular contour require accumulations of glass fibers to various thicknesses to impart to the final product the desired rigidity and strength associated with the heavier density materials. In effecting such a pile-up of fibrous glass in molds of irregular contour, it will be recognized that difficulty exists in assuring a uniform density of matter throughout the product and accordingly the surface hardness varies throughout the product depending upon the varying densities thereof. These problems arise particularly because of the lack of flowability of fibrous glass masses in the mold in the manner of fluid materials such as molten plastics.

In view of the foregoing, it is an object of the present invention to provide a method and means for manufacturing molded fibrous-glass articles having surfaces controllably smooth and soft even when the fibrous glass mass is of dense character.

It is another more specific object of this invention to provide a method and means whereby an automobile crash pad can be constructed of molded glass-fiber masses formed into a rigid structure having an impact distributing surface layer of soft resiliently associated fibers in integral relationship therewith.

Another object of this invention is to provide a method and means for imparting improved depression recovery properties to an automobile crash pad of molded fibrous glass.

The thickness of glass fiber accumulations piled within a cavity for molding operations is determined by the density necessary in the final article to effect the strength characteristics desired and dictated by use, as well as the number and thickness of fibers necessary to provide the rigidity and surface texture desired. The densities of the final molded product usually vary throughout the article especially when the article is intricate in shape, since it is extremely difficult to insert the precise number or pile-up of fibers in each incremental area of the mold to effect uniformity of density throughout. Additionally, different densities are often desired in different parts of an intricately shaped article, the greater densities being desired in those portions of the article where greatest strength is necessary. Usually with variations in density existing throughout, surface texture and hardness variations also exist throughout the article. Such variations are most frequently undesirable and in some instances, the surface characteristics of the whole or portions of the article are definitely opposed to those necessary with respect to the functional aspects of the article.

In accordance with the principles of this invention, the entire surface or localized areas may be treated to impart uniformity in texture or hardness, or may be treated so as to obtain a degree of softness and resilience desired while still providing the density in the different portions of the article consistent with the strength and smoothness or wrinkle freeness required. In general, to obtain these results, articles molded according to the principles of the present invention are molded to the density required to prevent presence of surface wrinkles or folds in the final article and then are subjected to a working to impart the degree of softness desired in the exposed surfaces. It frequently occurs that the density required to prevent wrinkling of the surface is greater than that necessary to provide the strength required in the article. Regardless, according to the present invention, the degree of softness and resilience of a lower density material can be imparted by properly working the surface.

Working can be accomplished by passing a roller over the surface of the molded article to break the bonds between surface fibers joined together at their interstices during the mold curing operation. Bond breakage may be effected to considerable depths below the surface by application of the degree of pressure necessary to provide the amount of bond breakage by a single passage of the roller thereover, or by repetitively passing the roller back and forth over the surface with a pressure of lesser degree until the desired feel is imparted to the surface.

Even when an article molded of fibrous glass is treated to impart desired resilience to the surface, the depression recovery and surface appearance may not be that desired for particular applications to which the object is to be adapted. To improve the depression recovery properties, it has been found that a membrane of rubberlike material such as a neoprene latex sprayed over the surface and integrally associated therewith will in many instances render the article more adaptable for use. Such a surface membrane, beside improving recovery characteristics, is of advantage in providing improved appearance while simultaneously acting as a retainer surface for any loose fibers tending to separate from the surface.

The automobile crash pad of the present invention is a general type adapted to lay over the top of the instrument panel of the vehicle and to provide a soft resilient leading edge to distribute impact forces and to cushion the jar in instances such as when a child is bodily moved and its head is thrown forward into the panel on sudden application of brakes.

Figure 1:
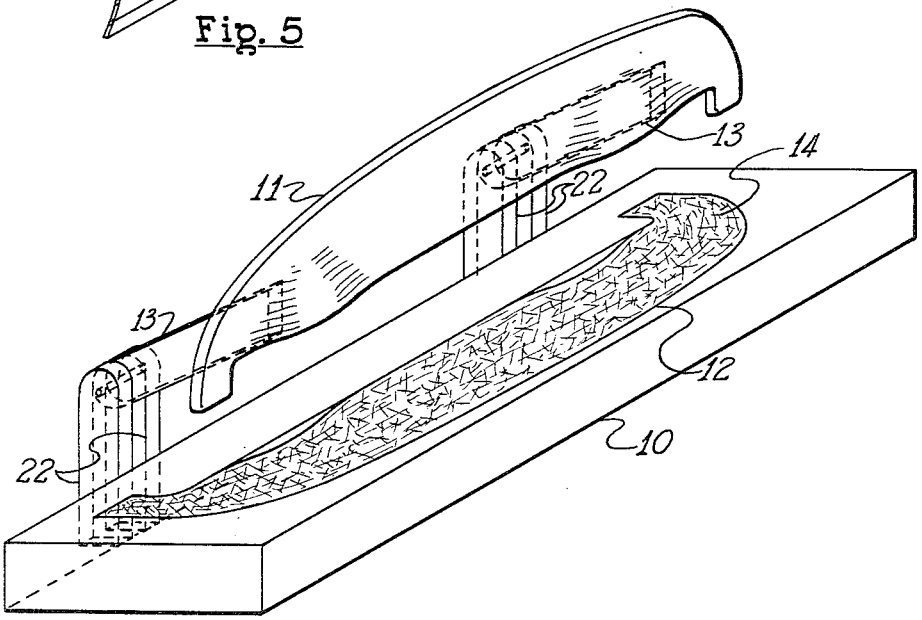
Figure 1 shows a platen-mated mold with fibers accumulated in the cavity.

Referring to the drawing in greater detail, the mold 10 as shown in Figure 1 has a cavity 12 arranged to be mated by a plug or platen 11. The platen has fixedly associated therewith a pair of support arms 13 hinged to two sets of mounting members 22 fixed to the mold in proper alignment to assure ease and exactness in establishing the desired mated relationship between the platen with the mold.

Figure 3:
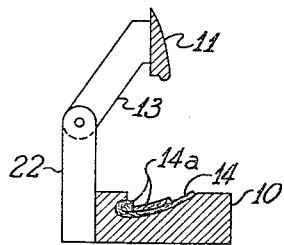
Figure 3 shows in cross section the mold of Figure 1 in open condition with fibers in mat and strip form laid therein to different depths prior to closure.

Figure 3 illustrates the manner in which the fibers 14 are piled in the mold prior to closure. Uncured glass fibers are placed in the mold 10 in sufficient amounts to completely fill the cavity and also to establish the densities in the various portions of the crash pad in accordance with strength requirements in the different portions. As indicated above, the various desired densities are obtained by piling the glass fibers 14 to a greater thickness in proportion to the thickness of the cavity in the portions where the greater densities are desired. A greater proportional pile-up is provided in the parts where tendency exists for the surface to wrinkle following the molding operation. As an example, in one instance it was found that a density of fibers of four pounds per cubic foot was adequate at the leading edge of the crash pad for structural purposes, whereas densities as low as this did not provide a finished surface of the smoothness desired, but instead acquired wrinkles in the surface during the molding operation. To alleviate this condition in accordance with the present invention, the density of fibers was increased in the leading edge to eight pounds per cubic foot.

Figure 3 also illustrates how the fibers may be laid in the form of strips 14a in the leading edge and forward portions of the mold to provide a greater density in these portions of the finished crash pad, thereby assuring a smooth surface for the forward portions. The diameter of the fibers has not been found critical with relation to this invention but lengthy and finer fibers in the order of .00003 inch are preferred. Fibers having diameters up to and above .0003 inch perform satisfactorily, however, and have an advantage in economy of production.

Figure 2:
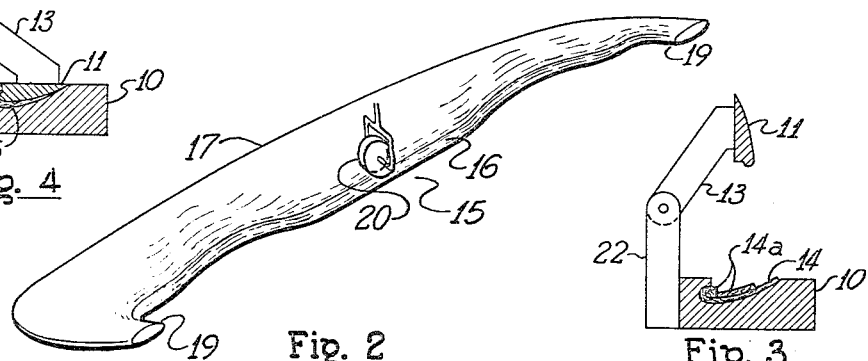
Figure 2 shows the molded fibrous glass crash pad with a roller being passed over the leading edge to effect breakage of bonds at interstices of fibers in the surface layer to produce the soft resilient property desired at the leading edge.

Figure 2 shows the general shape of a crash pad 15 molded in this manner. The pad is of contoured shape having various densities and thicknesses at predetermined locations. It has a leading edge 16 desired to be of soft resilient character and a thinner trailing edge 17 of more dense character. The central portion is somewhat curvilinear in shape to pass snugly over the correspondingly shaped central portion of an instrument panel for which it is intended. The ends of the pad are provided with extensions 19 to cover the corresponding forwardly extending corner portions on top of the instrument panel.

Figure 5:
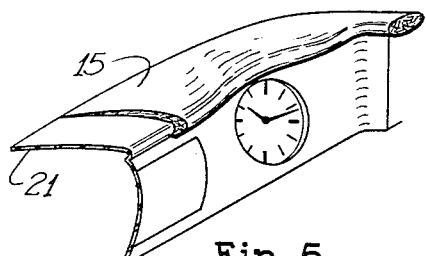
Figure 5 shows the molded crash pad in part illustrating the manner in which it is installed over an instrument or dash panel of an automobile.
Figure 4:
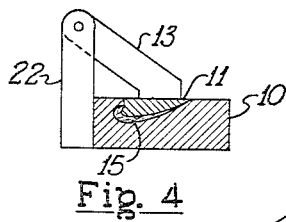
Figure 4 shows in cross section the mold of Figure 1 in closed condition for curing of crash pad.

As may be seen in Figures 4 and 5, the leading edge 16 is of somewhat intricate shape in being arranged to overlap the corresponding leading edge of the instrument panel 21. The desired softness and resilience is imparted to the leading edge by passage of a roller 20 thereover as shown in Figure 2 and exerting the pressure necessary to impart the desired degree of modification in surface characteristics. Working of the fibrous surface in this manner causes the bonds at contacting crossovers of the fibers to be broken. The bonds are produced by binder material sprayed on the fibrous mass before the molding operation.

The binder content of the mass may be in the order of 20 to 30 percent or more by weight of the fibrous mass. Various conventional binders may be used. For instance, phenol formaldehyde, polyvinyl acetate, polystyrene and others may be used. Curing temperatures may vary according to the particular resins used, and will generally fall within a range from 150° F. to 700° F. The pressure exerted on the mold need only be sufficient to retain the mass of fibers compressed within the mold to the desired densities until the curing of the binder or interbonding of fibers is completed. In this respect, the platen may merely be clamped in mated relation with the cavity mold to provide the necessary pressure.

The breakage of bonds with the roller 20 is effected by application of a pressure sufficient to break the bonds at the contacting crossovers but is carefully prevented from being so great as to effect breakage of the fibers themselves. Since glass fibers have great flexural strength while the thermosetting bonding material is more brittle, this may be readily accomplished.

In general, it is preferred that the area being worked at any given instance be relatively small. More specifically, it is more desirable that a small area or line contact be established by the working means, in order to permit localized depression and a consequent freeing of the small number of fibers contacted from the surrounding mass. Such action may be accomplished under light pressure which promotes flexing of the individual fibers and separation from others to which they are connected without substantial breakage of the fibers in the mass. In another descriptive sense, the localized compression of fibers at the surface permits and effects a spreading distribution of forces from point of contact by the working means rather than a downward concentration which results when large areas of the surface are all subjected to the same pressure per unit area. Thus, a given force per unit area, when applied over a small area, tends to effect breakage of bonds of fibers over a wider area than is contacted and has the additional advantage that bond breakage on each pass of the roller will extend to a relatively shallow depth to provide thin layers in which fiber bonds are broken. Such forces when concentrated downwardly tend to break the fibers and may break bonds between fibers to too great a depth with the consequence that desired strength and rigidity may be lost.

In accordance with these principles, if fiber bonds are desired to be broken to depths somewhat greater than a thin surface layer, all that need be done is that the roll be passed over the pad surface repetitively. In such instances, the initial passage breaks the bonds in the uppermost level of the thickness of the pad while on subsequent passage over the surface, underlayers of fibers are broken until interfiber bonds to the desired depth are broken.

Although a roller is herein illustrated as used for accomplishing a working of the surface, the invention is not limited to working by such a tool only since the principles once recognized can be effected by other devised means. For instance, a localized line contact working of the crash pad may be done by proper manipulation of the pad while it is still in the open mold using the mold surfaces as the working surfaces. High frequency vibration may also be utilized to produce the working effects and may be operated either locally or generally over the surfaces of the pad.

Even though a large proportion of the bonds are broken at fiber junctures and tend to separate from the mass, they are generally retained in the main body of fibers by reason of their physical inter-association with each other such as in a jack-straw arrangement which acts to retain them within the body in resiliently associated relationship. However, to assure positive retention of the individual fibers within the body, the surface of the body may be sprayed with a membrane-forming material as mentioned above. Such a membrane provides depression recovery properties upon exertion of forces thereagainst such as when an object is thrown against it. Because of its resilience, the surface gives depending upon the magnitude of the force, and upon removal of the force, the membrane acts cooperatively with the normal stability characteristics of the surface to fill in the cavity formed therein. The stretchability property therefore is utilized to maintain a smooth surface of the pad, even after impacts such as will break fibers or effect the breakage of bonds to levels in the depth of the pad beyond those which are desirable.

It has been found, however, that a molded fibrous article has tremendous absorption properties so as to require an excessive and costly amount of membrane-forming fluid. To remedy this condition when a neoprene latex is used, a powdery material such as talc or starch is added to the latex before spraying over the fibrous surface. This reduces the absorption characteristics considerably, causing the fluid to remain primarily at the surface where it best provides the depression-recovery characteristics for the molded article. A material which has been successfully used in this manner comprises one pound of processed starch added to a gallon of neoprene latex mix, the mix being a water dispersion of 42 percent solids. Such a surface coating material can be sprayed on and cured at 450° F. in a separate relatively short cycle of the order of three minutes. To further enhance the appearance of the product, a material such as rayon flocking may be sprayed over the surface of the mold-cured pad on a film of air drying adhesive or one that cures at moderate temperatures to give the surface a soft texture beyond that provided by the soft fibrous glass.

A soft resilient membrane coating can also be imparted to the article directly in the molding process by resorting to a material such as a plasticized vinyl polymer. In providing such a surface, the mold surfaces may be first sprayed with a coating of material such as silicone which will act as a parting agent to enable easy removal of the finished article after molding. The plastisol is then sprayed over the silicone coating and the fibers inserted thereover for the molding operation. It should be noted that this method of providing a surface membrane has the advantage of protecting the polished metal surface of the mold during loading of the mold. In this respect, the plastisol provides a semi-hard surface for receipt of the fibers when sprayed over the mold surfaces while they are hot. Additionally, the surface texture may be modified in the molding operation by providing embossments in the mold to produce surface effects such as simulated leather.

While the present invention has been described in connection with a particular molded fibrous glass product, it will be obvious to those skilled in the art that the principles have broad application to other molded fibrous-glass articles and that changes and modifications may be made without departing from this invention in its broader aspects. For instance, the invention may be used in the manufacture of articles such as dunnage forms, structural parts of items such as refrigerator cabinets, and the like. It is therefore the aim in the appended claims to cover all such changes and modifications as fall within the true spirit and scope of this invention.

I claim:

1. The method of producing a molded fibrous glass article comprising assembling glass fibers with heat-curable resin material in a mold, said assembly of fibers being accumulated to thicknesses in the mold such as will assure wrinkle free smoothness in the molded article, compressing said assembly into the desired shape, heating the compressed mass while retained in the desired shape to cure the resin and cause bonding of the points of fiber contact, and working the surface masses of the newly bonded fibers of the article by exerting compressive forces over at least part of the surfaces of the molded article such as will break at least a portion of the bonds for a relatively short depth at the surface of the article to provide portions having a fiber surface layer softer than that originally provided upon curing of the resin.

2. The method of producing a molded fibrous glass article comprising forming an assembly of glass fibers having a heat-curable bonding material incorporated therewith in a mold, said assembly of fibers being accumulated to different thicknesses in the mold in accordance with densities desired in various portions of the molded article, compressing said assembly into the desired shape, heating the compressed mass while retained in the desired shape to cure the bonding material and cause bonding between the glass fibers at their points of contact, and providing an integral surface layer of softer, more resilient character for the article by exerting compressive forces on the surface of magnitude which will break at least a portion of said bonds in only the surface layer of fibers, and applying a surface membrane of resilient material in integral relation with the surface layer of said article whereby the depression recovery property of said article is improved.

3. In a method of producing a molded article of fibrous glass, the steps comprising forming an assembly of glass fibers having a heat-curable bonding material incorporated therewith, compressing said assembly into predetermined shape, heating the compressed mass while retained in the desired shape to cure the bonding material and cause bonding between the glass fibers at their points of contact, and providing an integral surface layer of fibers of softer, more resilient character than the under mass of bonded fibers of the article by exerting localized compressive forces on the surface of such magnitude as to break at least a portion of said bonds in only the top layer of fibers.

4. In the method of producing a molded fibrous glass article, the steps of providing a smooth surface for the article comprising assembling fibers coated with uncured resin in the forming cavity of a mold in sufficient numbers in proportion to the various thicknesses of the cavity to provide a sufficiently close association of fibers during curing of the resin to impart the smoothness desired in the molded article, and working the smooth surface by exerting localized compressive forces thereon to unbond a layer of fibers immediately thereunder to impart a degree of surface softness corresponding to a lower density accumulation of fibers.

5. In the process of producing a relatively dense rigid molded article of interbonded glass fibers, the method of imparting an improved depression recovery and shock absorbing surface comprising the steps of applying a stretchable resilient membrane over said surface and working the membrane against the fibers immediately thereunder by exerting localized compressive forces on the membrane to break at least a portion of the bonds between fibers of the surface to impart a desired degree of softer resilience to the surface than is characteristic of the general density of the article.

6. An automobile crash pad made of molded fibrous glass, comprising an elongated generally flat member having contours to match the top surface of an instrument panel of an automobile, said pad having an overhanging leading edge to cover the top front edge of the instrument panel, said leading edge being of density to prevent bottoming on normal impact and being provided a relatively soft resilient surface layer of fibers to effect distribution of forces of impact.

7. An automobile crash pad molded of fibrous glass, comprising a plurality of interbonded glass fibers molded to form a pad having a general shape arranged to match the top of an automobile instrument panel, said pad having an overhanging leading edge to cover the top front edge of the instrument panel, said leading edge having a density sufficient to prevent bottoming on normal impact and having a softer top layer of fibers to effect distribution of forces of impact, and a stretchable membrane integrally associated with the top fibers of at least the leading edge of said pad.

8. An article molded of fibrous glass comprising a mass of glass fibers closely interbonded to a density sufficient to impart rigidity thereto, said article having a surface layer including unbonded fibers sufficient in number to impart a greater resiliency and softer feel to such surface than is characteristic of the general density of the interior of the article, and a stretchable membrane integrally associated with the more resilient surface layer of fibers to improve the depression recovery characteristics of said surface.

9. The method of producing a molded fibrous glass article comprising forming an assembly of glass fibers having a heat-curable bonding material incorporated therewith in a mold cavity, said step of forming an assembly of glass fibers comprising laying up in said cavity compressible fibrous layers of different lengths, widths and thicknesses in aligned relation in accordance with cavity dimensions and densities desired in the molded article, each such layer consisting of a mass of randomly oriented discontinuous glass fibers compressing said assembly to desired shape in said cavity, heating the compressed mass while retained in said shape to cure the bonding material and cause bonding of the glass fibers at their points of contact, and spraying a dispersion of an elastomeric material into adhering relation with a surface of the article to form a stretchable resilient surface membrane in intimate relation over such surface whereby the depression recovery property of the surface is improved.

References Cited in the file of this patent

UNITED STATES PATENTS

| | | |
|---|---|---|
| 1,959,845 | Thomas | May 22, 1934 |
| 2,070,760 | Straith | Feb. 16, 1937 |
| 2,349,909 | Meharg | May 30, 1944 |
| 2,373,033 | Kopplin | Apr. 3, 1945 |
| 2,495,636 | Hoeltzel | Jan. 24, 1950 |
| 2,495,640 | Muskat | Jan. 24, 1950 |
| 2,517,724 | Schuh | Aug. 8, 1950 |
| 2,599,317 | Brady | June 3, 1952 |
| 2,600,843 | Bush | June 17, 1952 |
| 2,610,337 | McMillin et al. | Sept. 16, 1952 |
| 2,626,163 | Scantlebury | Jan. 20, 1953 |
| 2,632,187 | Wooffendale | Mar. 24, 1953 |
| 2,637,673 | Barnard | May 5, 1953 |
| 2,651,986 | Greig | Sept. 15, 1953 |

FOREIGN PATENTS

| | | |
|---|---|---|
| 617,268 | Great Britain | Feb. 3, 1949 |
| 470,047 | Canada | Dec. 12, 1950 |